United States Patent
Radhakrishnan et al.

(10) Patent No.: US 8,924,961 B2
(45) Date of Patent: Dec. 30, 2014

(54) VIRTUAL MACHINE SCHEDULING METHODS AND SYSTEMS

(75) Inventors: Ramesh Radhakrishnan, Austin, TX (US); Arun Rajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1433 days.

(21) Appl. No.: 12/260,477

(22) Filed: Oct. 29, 2008

(65) Prior Publication Data

US 2010/0107159 A1  Apr. 29, 2010

(51) Int. Cl.
*G06F 9/50* (2006.01)

(52) U.S. Cl.
CPC .................. *G06F 9/5055* (2013.01)
USPC .......................................... 718/1

(58) Field of Classification Search
CPC ............................................. G06F 2009/4557
USPC .......................................................... 718/1
See application file for complete search history.

(56) References Cited

U.S. PATENT DOCUMENTS

| | | | |
|---|---|---|---|
| 8,141,075 B1 * | 3/2012 | Chawla et al. | 718/1 |
| 2004/0098544 A1 * | 5/2004 | Gaither et al. | 711/154 |
| 2007/0260723 A1 | 11/2007 | Cohen et al. | |
| 2009/0210527 A1 * | 8/2009 | Kawato | 709/224 |

OTHER PUBLICATIONS

Carl A. Waldspurger, Memory Resource Management in VMware ESX Server, Proc. Fifth Symposium on Operating Systems Design and Implementation, Dec. 2002, 1-14.

* cited by examiner

*Primary Examiner* — Andrew Caldwell
*Assistant Examiner* — Benjamin Geib
(74) *Attorney, Agent, or Firm* — Baker Botts L.L.P.

(57) ABSTRACT

A method for managing virtual machines in an information handling system (IHS) is disclosed. The method may include receiving a characteristic of a first virtual machine from a connection broker and hosting the first virtual machine on a virtualization server. The method may further include determining availability of more than one virtual machine and if more than one virtual machine is available, hosting a second virtual machine having the characteristic of the first virtual machine.

17 Claims, 5 Drawing Sheets

VIRTUAL MACHINE SCHEDULING METHODS AND SYSTEMS

TECHNICAL FIELD

The present disclosure relates generally to the field of information handling systems, and more specifically, to scheduling optimizations within information handling systems implementing virtualization.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In current client-server architectures, server sprawl may post a significant and costly issue. Server sprawl may refer to a situation having multiple underutilized servers taking more space and consuming more resources than can be justified by their workload. In response, several techniques toward server consolidation, i.e., decreasing the total number of servers required, have been developed. One technique may involve the idea of server virtualization, which may entail using software to mask server resources from users by creating multiple software implemented virtual servers on a single physical server. Under this framework, virtualization software may manage and allocate the physical server's resources among all the virtual servers, though distinct sets of resources may be simulated for each individual virtual server. Thus, the total number of physical servers may be reduced since each physical server may host more than one virtual server. Furthermore, the utilization levels of the physical servers may increase as well by distributing the virtual servers evenly according to server utilization level across the physical servers.

The concept of server consolidation and virtualization has also extended to desktop consolidation and virtualization. A desktop may refer to an information handling system, such as a personal computer (PC) or a software implementation resembling a personal computer to a user i.e., a virtual machine or the like. A server is typically an information handling system with a single or multiple processors that can couple multiple desktops or personal computers together in a network. In desktop consolidation architectures implementing desktop virtualization, user desktops may be centralized on a server or group of servers such that the servers may create virtual machines according to the users' needs. For example, rather than a user having a physical personal computer, possibly in a remote office location, the user may instead have a thin client. A thin client may refer to any information handling system which depends primarily on a server for processing power, memory, and other resources and may focus on conveying inputs and outputs between the user and the server. Indeed, when a user logs into a server through a thin client, the server may connect the thin client with a virtual machine. The thin client may provide a display for the virtual machine and thereby provide a resemblance to a physical personal computer. Thus, certain efficiencies may be realized including, but not limited to, reducing the number of physical personal computers and enabling each virtual machine to execute a different operating system from one another.

Desktop virtualization, however, may pose added complexity to a system or network, particularly in the assignment or scheduling of virtual machines among physical servers. Indeed, current scheduling policies may be tailored toward server consolidation scenarios and may not be optimal for desktop consolidation solutions. For example, some virtualization servers may have the ability to group virtual machines with similar characteristics, such as the same operating system and/or application or the like, and use this information to identify memory pages common between the virtual machines. Thus, virtual machines with common memory pages may share a single physical memory rather than using separate memory pages. In some instances, this feature may be referred to as transparent page sharing. As a result, grouping together virtual machines with similar characteristics on a virtualization server having transparent page sharing could provide significant savings in memory, increase server utilization levels, and reduce costs. Current scheduling techniques may not take these factors into account when placing virtual machines among the physical servers and may instead rely on predefined policies set by a user. Thus, a need exists for methods and systems for providing a scheduling optimization targeted for desktop virtualization.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for managing virtual machines in an information handling system (IHS). The method may include receiving a characteristic of a first virtual machine from a connection broker and hosting the first virtual machine on a virtualization server. The method may further include determining availability of more than one virtual machine and if more than one virtual machine is available, hosting a second virtual machine having the characteristic of the first virtual machine.

Another aspect of the disclosure provides an information handling system (IHS) including a first virtual machine, a plurality of virtualization servers, a client and a connection broker in communication with the client. The connection broker may determine a characteristic of the first virtual machine and host the first virtual machine to a matched virtualization server of the plurality of virtualization servers, wherein the matched virtualization server hosts a second virtual machine sharing the characteristic of the first virtual machine.

Yet another aspect of the disclosure provides a computer-readable medium having computer-executable instructions for performing a method for managing virtual machines in an information handling system (IHS). The method includes receiving a characteristic of a first virtual machine from a connection broker and hosting the first virtual machine on a first virtualization server. The method also includes determining availability of more than one virtual machine and if more than one virtual machine is available, hosting a second virtual machine having the characteristic of the first virtual machine. The method may further include determining if the first virtualization server has reached a predetermined limit for a resource, wherein the resource includes CPU capacity or memory space and establishing a second virtualization server to host at least one virtual machine.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems, methods, and computer-readable mediums are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a machine" may refer to one or several machines, and reference to "a method of managing" includes reference to equivalent steps and methods known to those skilled in the art, and so forth. Furthermore, the terms "comprise," "include," have," and any variations thereof, are intended to cover a non-exclusive inclusion, such that any apparatus, system, method or article that comprise a list of elements are not necessarily limited to those elements, but may include other elements not expressly listed or inherent to such apparatus, system, method or article.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or-more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
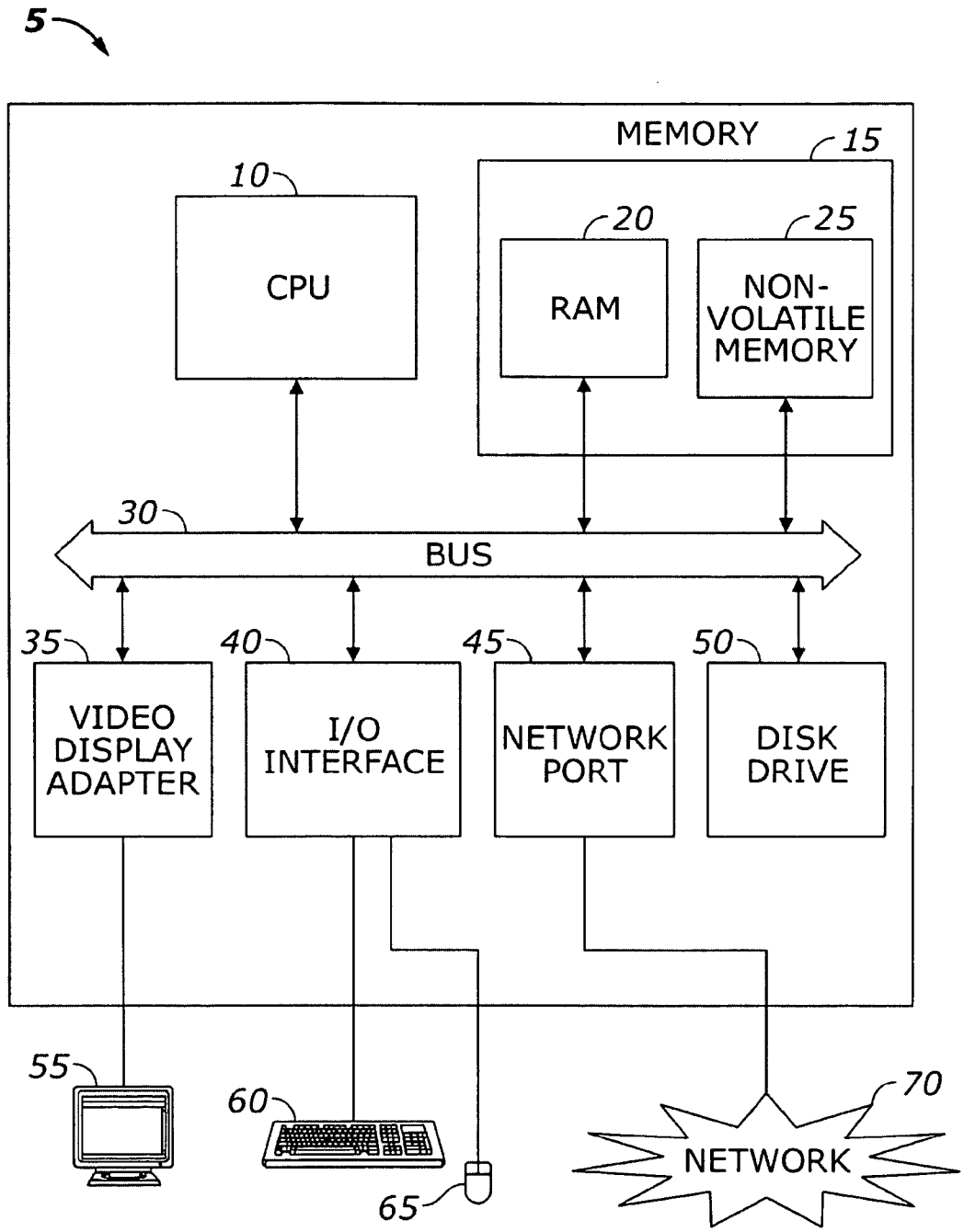
FIG. 1 represents a schematic illustrating an information handling system (IHS) in accordance with one aspect of the present disclosure.

FIG. 1 illustrates one possible implementation of an IHS 5 comprising CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
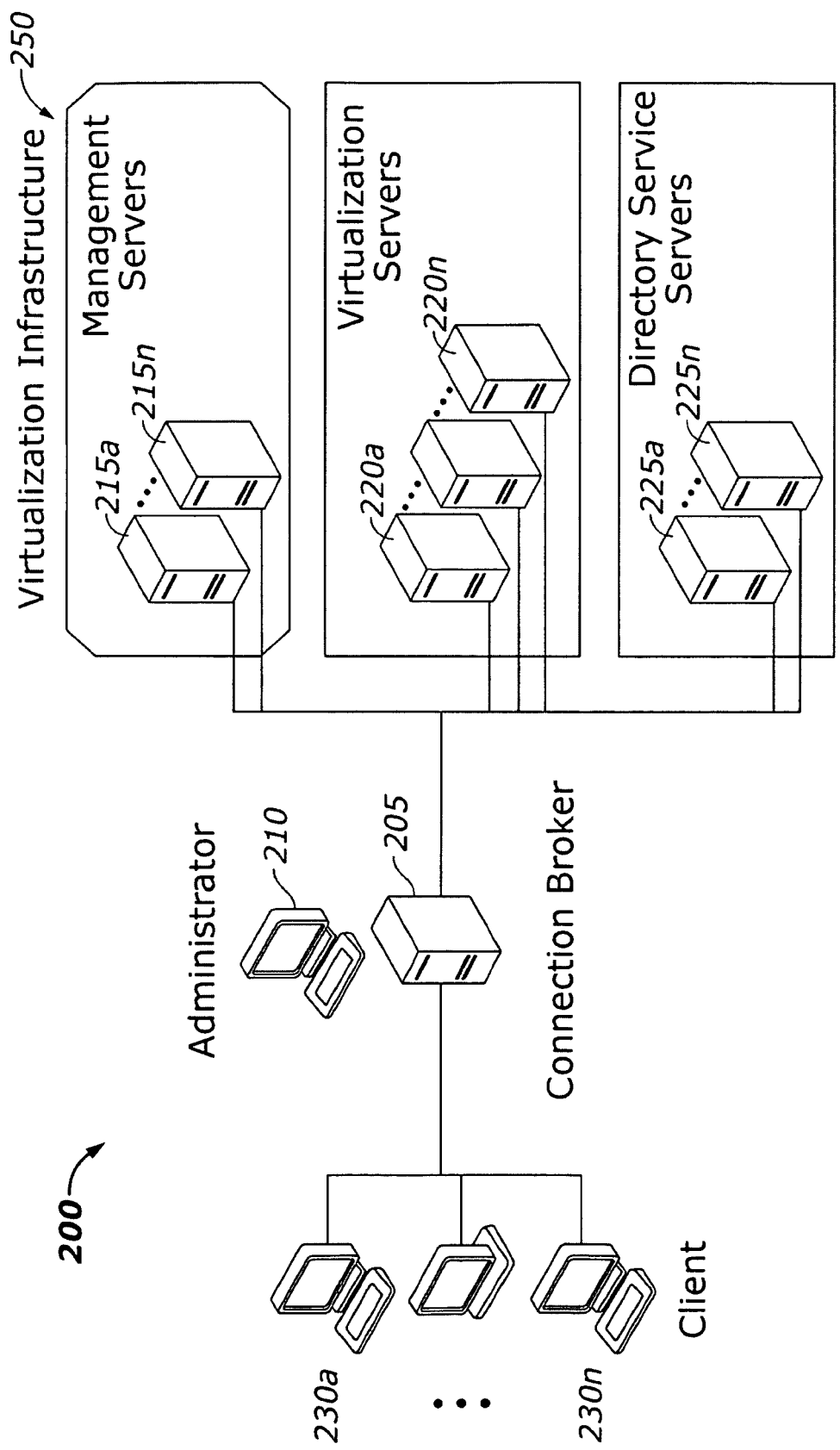
FIG. 2 represents a schematic illustrating architecture for a virtualization scheduling optimization in accordance with one aspect of the present disclosure.

FIG. 2 provides a schematic of an IHS 5 configured for desktop virtualization. The IHS 5 may include a connection broker 205 which may facilitate communication and connections between clients 23a-n and virtual machines (VMs) hosted by the virtualization infrastructure 250. The virtualization infrastructure 250 may include management servers 215a-n, virtualization servers 220a-n, and directory service servers 225a-n.

A desktop VM (not pictured) may refer to a software implemented machine that may resemble a personal computer to a user. Multiple desktop VMs may be hosted by a single physical virtualization server 220a-n and may all share the virtualization server's resources such as its processor(s), memory, and long-term storage as well as network resources of the IHS 5. Despite the underlying resource-sharing structure, each desktop VM may believe itself to exist as its own separate IHS with its own separate resources. As a result of this virtual abstraction, certain advantages may be achieved including, but not limited to, enabling each desktop VM to execute a different operating system, providing different work templates for different users, and decreasing the cost of the overall system by requiring fewer physical resources.

The virtualization infrastructure 250 may provide a framework for creating a virtualization abstraction for the IHS 5 such as virtual servers, desktop VMs, or any other type of VMs. As illustrated in FIG. 2, the virtualization infrastructure 250 may include management servers 215a-n, virtualization servers 220a-n, and directory service servers 225a-n. While FIG. 2 depicts the virtualization infrastructure 250 as comprising the aforementioned three servers, it should be noted that in other instances, the virtualization infrastructure may comprise any suitable number or type of server or any other information handling system in any combination. The management servers 215a-n may function as the main control node and may employ software such as VMWare VirtualCenter, for example, to manage the various components of the virtualization infrastructure 250. As an example, the management servers 215a-n may provide database structures for virtualization server 220a-n resources and allow monitoring of the performance of essential system components. To this end, management servers may enable redistribution and allocation of virtualization server 220a-n resources among the desktop VMs according to predefined user polices. For example, if the workload of one or more desktop VMs significantly increases, the management servers 215a-n may redistribute the desktop VMs among the virtualization servers 220a-n such that the utilization levels are balanced across the virtualization servers 220a-n. Conversely, if the overall workload diminishes, the management servers 215a-n may then temporarily power down some of the virtualization servers 220a-n accordingly and consolidate the desktop VMs on the remaining servers. An example of this ability to redistribute virtualization server 220a-n resources among desktop VMs may be VMWare's Distributed Resource Scheduler (DRS).

The virtualization servers 220a-n may host the desktop VM's by executing virtualization software such as VMWare ESX Server, Citrix XenServer or Microsoft Virtual Server, for example. As used herein, the virtualization software may be referred to as the hypervisor or the parent partition. Thus, the virtualization servers 220a-n may provide a virtualization engine that drives the creation and distribution of the desktop VMs and maintains the layer of abstraction between the desktop VMs and the servers' underlying hardware resources, e.g., processor(s), memory, and storage. Furthermore, the virtualization servers 220a-n may employ transparent page sharing, a feature which may enable desktop VMs, hosted by the same virtualization server and executing similar operating systems, applications, and/or the like, to share physical memory pages. For example, two desktop VMs running a Windows XP operating system may have a common memory page. Therefore, rather than creating two separate physical memory pages in system memory, only one physical memory page may be created and shared between the two desktop VMs. Consequently, the memory over-commitment ratio, discussed further in FIG. 4, may be significantly increased by eliminating redundant copies of memory pages.

The directory service servers 225a-n may maintain a database of user accounts and associated information. Additionally, the database may identify certain resources that each user may require. For example, when a user attempts to log into the IHS 5, the connection broker 205 may check the database within the directory service servers 225a-n to match a username and password to what the user has input. Furthermore, the directory service servers 225a-n may also contain information pertaining to what type of operating system and certain network resources the user may need. The connection broker 205 may then connect the user to a corresponding desktop VM based on those needs.

A directory service may serve to store information and settings relating to an organization in a central, organized and accessible database. The directory service may allow administrators to assign enterprise wide policies, deploy software, and apply critical updates to an entire organization. Examples of directory services may include Microsoft Active Directory, Banyan Vines, NT Directory Services (NTDS), Sun Java System Directory Services and the like.

As previously discussed, the connection broker 205 may generally direct incoming connection requests from users or clients 230a-n to available desktop VMs, which may be hosted on one more of the virtualization servers 220a-n. The connection broker 205 may also be referred as the connection server, connection service, and/or the like. Specifically, the connection broker 205 may authenticate clients 230a-n, checking their information with the directory service servers 225a-n, and assign clients to the hosted desktop VMs. These assignments may be based on certain predefined policies and group memberships that the administrator 210 may set for each client 230a-n. Moreover, the connection broker 205 may have the ability to communicate directly with the management servers 215a-n and/or virtualization servers 220a-n to power on and off desktop VMs as needed. Thus, the connection broker 205 may have pertinent information regarding the characteristics of each desktop VM including, but not limited to, operating system type, user type, and group policy. User type may refer to the class of user whereas a group policy may indicate permissions and resources that they are set by an IT administrator for each group or user type. For example, possible user types may include professional groups such as human resources (HR) group, engineering group, finance group or the like. Group policies, for example, may include any suitable permission or resource such as printer(s) and peripherals(s), for example.

In addition to connecting clients 230a-n to desktop VMs, the connection broker 205 may also schedule the desktop VMs, according to their characteristics, among the virtualization servers 220a-n. For example, the connection broker 205 may group desktop VMs having the same operating system type and/or executing similar application(s) together and assign them to be hosted by the same virtualization server 220a-n. Scheduling the desktop VMs in such a manner may take advantage of the virtualization server's 220a-n transparent page sharing algorithm. For instance, desktop VMs executing similar operating systems and applications may be capable of sharing more memory pages, thereby significantly reducing the physical amount of memory needed.

It should be noted that in alternate implementations, the desktop VMs may be scheduled by components other than the connection broker 205. For example, the management servers 215a-n may also have a scheduling algorithm that accounts for the characteristics of the desktop VMs (i.e., operation system type, user type, etc.). Furthermore, in other instances, the connection broker 205 itself may contain information such as the resources and operating type pertaining to each user account, thereby obviating the need for obtaining this data from separate directory service servers 225a-n. In addition, a client may be a physical IHS at a user's workplace or, in other instances, may be a thin client that may rely on the management servers 215a-n, virtualization servers 220a-n, or any other remote server(s) for processing power. Thus, a thin client may focus on providing input and output functions between a user and the remote servers or desktop VMs. In addition, a thin client may provide a display for the interactions between the user and the remote servers and may therefore resemble a regular PC computer to the user.

Figure 3:
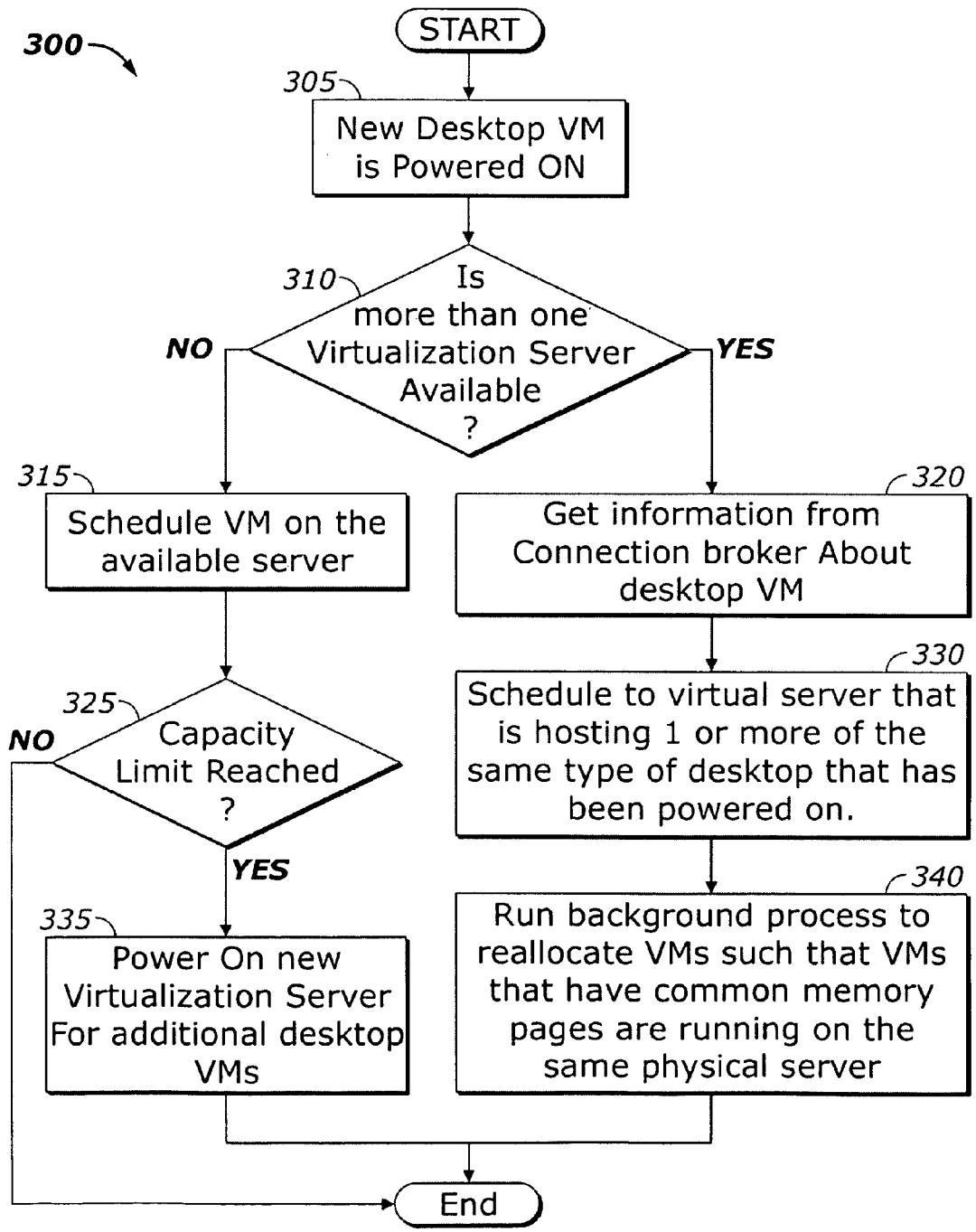
FIG. 3 represents a flow diagram illustrating a scheduling optimization process in accordance with one aspect of the present disclosure.

Turning now to FIG. 3, a process, indicated generally at 300, is illustrated for scheduling desktop VMs to virtualization servers. In step 305, a new desktop VM may be powered on, and as such, be turned on from an idle state, selected from a pool of unused desktop VMs, created as a new desktop VM or the like. Additionally, this step may be performed by a variety of devices including, for example, the connection broker, the management servers, virtualization servers, and/or the like. Next, in step 310, the scheduler may determine whether more than one virtualization server is available to host the desktop VM. If so, the scheduler may proceed to step 320 to retrieve information about the desktop VM from the connection broker 205. As previously mentioned, this information may pertain to certain characteristics of the desktop VM such as the operating system type, the user type, and group policy. After collecting this information, the scheduler may then schedule the desktop VM to a virtualization server that already contains one or more desktop VMs that share one or more of the same characteristics as the recently powered on desktop VM in step 330. This virtualization server may be referred to as the matched virtualization server. Finally, in step 340, a background process, such as transparent page sharing, may be executed on the virtualization server to enable desktop VMs having common memory pages to share the same physical memory page. Therefore, redundant memory pages may be eliminated and the physical memory usage reduced. It should be noted that the background process may be executed by a variety of devices including, but not limited to, the connection server, the management servers, the virtualization servers, and/or the directory service servers.

If, on the other hand, the scheduler determines that more than one virtualization server is not available, the scheduler may then proceed to step 315 and schedule the desktop VM on the singularly-available virtualization server. The virtualization server may be referred to as singularly-available since it may be the only virtualization server that is powered on in this situation. Next, in step 325, the scheduler may inquire as to whether the singularly-available virtualization server has reached a predetermined limit for resources including CPU capacity, memory space or the like. The capacity limit may be reached when the virtualization server no longer has available resources to host one more desktop VM. Information regarding the virtualization server's capacity limit may be located on the virtualization server itself, or any other component such as the connection broker, the management servers, and/or the directory service servers. If the virtualization server's resource capacity has been reached, the scheduler may then power on a new virtualization server in order to host any future additional desktop VMs in step 335.

Figure 4:
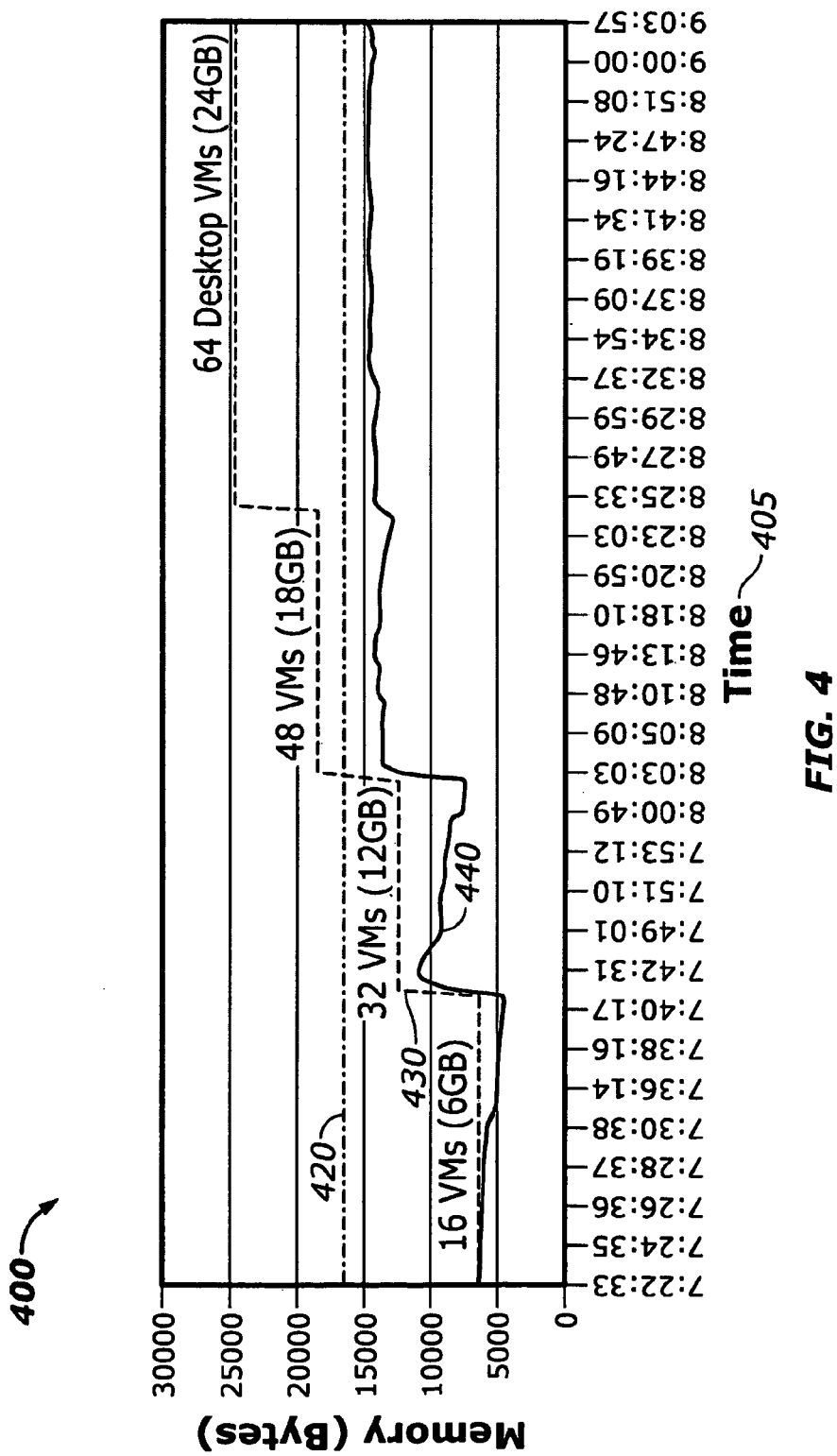
FIG. 4 represents a graph illustrating results of virtualization scheduling optimization in accordance with one aspect of the present disclosure.

Turning now to FIG. 4, a graph illustrating a characteristic of a virtualization server implementing transparent page sharing is indicated generally at 400. As illustrated, the graph 400 displays the ability of a virtualization server to achieve a relatively high memory over-commitment ratio due to the combination of the scheduling algorithm proposed by the present disclosure and the virtualization server's transparent page sharing capabilities. For example, the total installed system memory 420 on a virtualization server may be approximately 16 gigabytes (GB). FIG. 4 depicts varying amounts of memory allocated to the desktop VMs or committed memory 430 including 6 GB for 16 VMs, 12 GB for 32 VMs, 18 GB for 48 VMs, 24 GB for 64 VMs, while the actual memory used by the virtualization server, shown generally in the range of approximately 5 GB to 15 GB, is indicated at 440. Indeed, as the number of desktop VMs increase, the committed memory 430 may rise above the total installed system memory 420, most notably at 64 desktop VMs where the committed memory 430 may reach approximately 24 GB or approximately twice the amount of total installed system memory 420. Moreover, this over-commitment of memory may occur without degradation in performance of the virtualization server due to its transparent page sharing. For instance, the desktop VMs may have been scheduled to the virtualization server such that they may be executing the same operating system and running similar applications (e.g., word processing, spreadsheets, etc.). Thus, transparent page sharing may enable these desktop VMs to share a high number and/or percentage of memory pages, thereby achieving a high memory over-commitment ratio.

Figure 5:
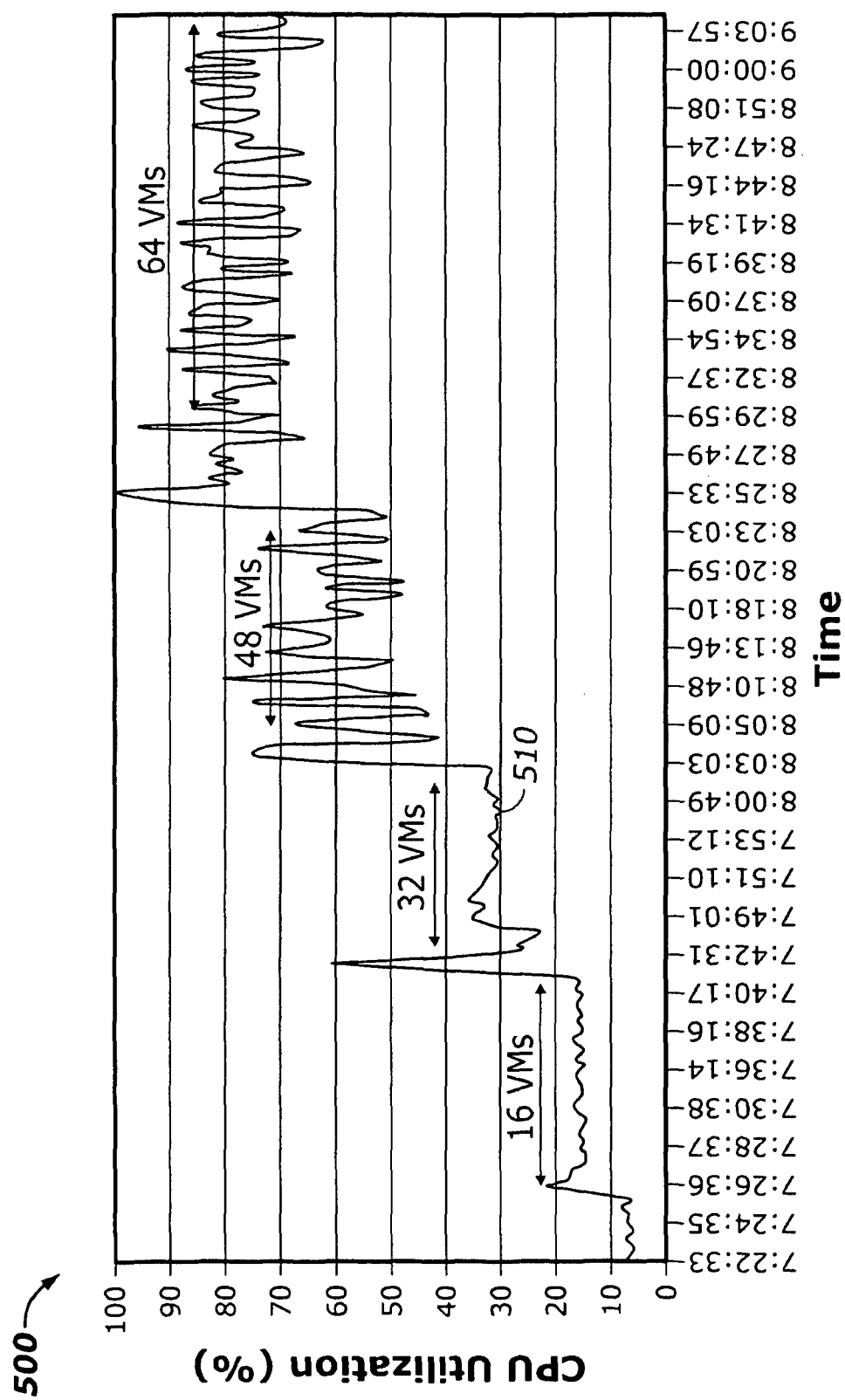
FIG. 5 represents CPU utilization levels corresponding to virtualization scheduling optimization in accordance with one aspect of the present disclosure.

Turning now to FIG. 5, a graph, indicated generally at 500, is shown illustrating CPU utilization levels 510 of the server(s) and VMs associated with FIG. 4. The graph 500 indicates that even as the IHS implementing the scheduling algorithm and transparent page sharing reaches a high memory over-commitment ratio, the CPU utilization levels 510 remain under 100% CPU utilization. Thus, the CPU may have additional capacity to handle spikes or abrupt increase(s) in the workload.

FIGS. 4 and 5 merely illustrate examples of characteristics of VMs which may be exhibited when utilizing the scheduling algorithm and/or transparent page sharing discussed herein. The description above, therefore, is set forth for the purpose of explanation and not limitation, to provide a thorough understanding of the present disclosure. The quantities thus mentioned such as memory (in bytes or gigabytes (GB)), time, quantity of VMs, for example, are merely illustrative and it should be appreciated that a number of other characteristics and/or quantities are included within the scope of the present disclosure.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for managing virtual machines in an information handling system (IHS), the method comprising:
   receiving at a connection broker from a directory service server a user account record associated with a user at a client, the user account record including an operating system type;
   connecting the client to a first desktop virtual machine having the operating system type included in the user account record;
   hosting the first desktop virtual machine on a first virtualization server of a plurality of virtualization servers;
   determining, by the connection broker, availability of more than one desktop virtual machine; and
   if more than one desktop virtual machine is available, grouping, by the connection broker, desktop virtual machines having the same operating system type on the same virtualization server;
   wherein the connection broker is communicatively coupled between the client and a plurality of virtualization servers and is physically and logically distinct from the client and the plurality of virtualization servers; and
   wherein the directory service serve is communicatively coupled to the plurality of virtualization servers and the connection broker and is physically and logically distinct from the client and the plurality of virtualization servers.

2. The method of claim 1, wherein the first desktop virtual machine is in communication with the client via the connection broker.

3. The method of claim 1 further comprising:
   establishing a common memory page between the first desktop virtual machine and a second desktop virtual machine having the same operating system type.

4. The method of claim 1, wherein the connection broker is managed by an administrator in communication with the connection broker.

5. The method of claim 1 further comprising:
   determining if the first virtualization server has reached a predetermined limit for a resource, wherein the resource includes CPU capacity or memory space.

6. An information handling system (IHS) comprising:
   a plurality of virtualization servers;
   a client; and
   a connection broker communicatively coupled between the client and the plurality of virtualization servers, the connection broker being physically and logically distinct from the client and the plurality of virtualization servers; and
   a directory service server communicatively coupled to the plurality of virtualization servers and the connection broker, the directory service server being physically and logically distinct from the client and the plurality of virtualization servers;
   wherein the directory service server comprises a database of user account records for the client, each user account record including an operating system type; and
   wherein the connection broker is configured to:
      obtain from the directory service server the operating system type of a particular user of the client;
      connect the client to a first desktop virtual machine having the operating system type of the particular user; and
      schedule the first desktop virtual machine to be hosted by a matched virtualization server of the plurality of virtualization servers, the matched virtualization server hosting desktop virtual machines having the same operating system type.

7. The system of claim 6, wherein the first desktop virtual machine is in communication with the client via the connection broker.

8. The system of claim 6 further comprising a management server configured to manage the plurality of virtualization servers, wherein the management server is a virtual center server.

9. The system of claim 6, wherein the directory service server is operable to provide a directory service selected from the group consisting of Microsoft Active Directory, Banyan Vines, Microsoft NT Directory Services (NTDS), Sun Java System Directory Services.

10. The system of claim 6, wherein the first desktop virtual machine is operable to share a common memory page with a second virtual machine having the same operating system type.

11. The system of claim 6 further comprising an administrator operable to manage the connection broker, wherein the administrator is in communication with the connection broker.

12. A non-transitory computer-readable medium having computer-executable instructions for performing a method for managing desktop virtual machines in an information handling system (IHS), the method comprising:
   receiving at a connection broker from a directory service server a user account record associated with a user at a client, the user account record including an operating system type;
   connecting the user to a first desktop virtual machine having the operating system type included in the user account record;
   hosting the first desktop virtual machine on a first virtualization server of a plurality of virtualization servers;
   determining, by the connection broker, availability of more than one desktop virtual machine;
   if more than one desktop virtual machine is available, hosting on the first virtualization server a second desktop virtual machine having the same operating system type as the first desktop virtual machine;
   determining, by the connection broker, if the first virtualization server has reached a predetermined limit for a resource, wherein the resource includes CPU capacity or memory space; and
   establishing a second virtualization server to host at least one desktop virtual machine having the same characteristic;
   wherein the connection broker is communicatively coupled between the client and the plurality of virtualization servers and is physically and logically distinct from the client and the plurality of virtualization servers; and
   wherein the directory service serve is communicatively coupled to the plurality of virtualization servers and the connection broker and is physically and logically distinct from the client and the plurality of virtualization servers.

13. The computer-readable medium of claim 12 having further computer-executable instructions comprising:
   establishing a common memory page between the first desktop virtual machine and the second desktop virtual machine having the same operating system type.

14. The computer-readable medium of claim 12, wherein the connection broker is managed by an administrator in communication with the connection broker.

15. The computer-readable medium of claim 12, wherein the first virtualization server and the second virtualization server are managed by a management server comprising a virtual center server.

16. The computer-readable medium of claim 12, wherein the first desktop virtual machine is in communication with the client via the connection broker.

17. The computer-readable medium of claim 16, wherein the directory service server is operable to provide a directory service selected from the group consisting of Microsoft Active Directory, Banyan Vines, Microsoft NT Directory Services (NTDS), Sun Java System Directory Services.

* * * * *